(12) United States Patent
Sanchez et al.

(10) Patent No.: US 10,107,120 B2
(45) Date of Patent: Oct. 23, 2018

(54) INTERNAL MANIFOLD FOR TURNING MID-TURBINE FRAME FLOW DISTRIBUTION

(71) Applicant: United Technologies Corporation, Farmington, CT (US)

(72) Inventors: Paul K. Sanchez, Wellington, FL (US); John S. Tu, West Hartford, CT (US); Kalpendu J. Parekh, Colchester, CT (US); William A. Daniels, Marlborough, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/245,798

(22) Filed: Aug. 24, 2016

(65) Prior Publication Data

US 2016/0362993 A1    Dec. 15, 2016

Related U.S. Application Data

(63) Continuation of application No. 13/360,988, filed on Jan. 30, 2012, now Pat. No. 9,447,694.

(51) Int. Cl.
*F01D 25/24* (2006.01)
*F01D 9/06* (2006.01)
(Continued)

(52) U.S. Cl.
CPC ............. *F01D 9/065* (2013.01); *F01D 25/12* (2013.01); *F01D 25/162* (2013.01); *F01D 25/24* (2013.01); *F01D 25/28* (2013.01); *F02C 3/04* (2013.01); *F02C 7/12* (2013.01); *F02C 6/08* (2013.01); *F05D 2240/14* (2013.01); *F05D 2240/55* (2013.01); *F05D 2260/20* (2013.01); *Y02T 50/676* (2013.01)

(58) Field of Classification Search
CPC .... F02C 6/08; F02C 7/12; F01D 25/28; F01D 25/162; F05D 2260/20
USPC .......................................................... 60/796
See application file for complete search history.

(56) References Cited

U.S. PATENT DOCUMENTS 3,287,906 A    11/1966  McCormick
3,558,237 A *   1/1971  Wall ..................... F01D 17/162
                                                        415/115
(Continued)

FOREIGN PATENT DOCUMENTS

GB    1516041    6/1978
GB    2041090    9/1980
(Continued)

OTHER PUBLICATIONS

International Preliminary Report on Patentability for PCT Application No. PCT/US2013/021870 dated Aug. 14, 2014.
(Continued)

*Primary Examiner* — Arun Goyal
*Assistant Examiner* — James McGlynn
(74) *Attorney, Agent, or Firm* — Carlson, Gaskey & Olds, P.C.

(57) ABSTRACT

A mid-turbine frame (MTF) for a gas turbine engine includes an inner manifold directing air to a turbine rotor of the gas turbine engine. The MTF includes an outer MTF case and an inner MTF case. The inner manifold of the MTF is located in the inner case of the MTF.

21 Claims, 3 Drawing Sheets

(51) Int. Cl.
| | |
|---|---|
| F01D 25/28 | (2006.01) |
| F02C 7/12 | (2006.01) |
| F01D 25/16 | (2006.01) |
| F01D 25/12 | (2006.01) |
| F02C 3/04 | (2006.01) |
| F02C 6/08 | (2006.01) |

(56) References Cited

U.S. PATENT DOCUMENTS

| | | |
|---|---|---|
| 3,754,484 A | 8/1973 | Roberts |
| 3,892,358 A | 7/1975 | Gisslen |
| 4,130,872 A | 12/1978 | Harloff |
| 4,135,362 A | 1/1979 | Glenn |
| 4,304,522 A | 12/1981 | Newland |
| 5,160,251 A | 11/1992 | Ciokajio |
| 5,292,227 A * | 3/1994 | Czachor ............... F01D 25/162 415/142 |
| 5,433,674 A | 7/1995 | Sheridan et al. |
| 5,447,411 A | 9/1995 | Curley et al. |
| 5,524,847 A | 6/1996 | Brodell et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 6,163,959 A | 12/2000 | Arraitz et al. |
| 6,223,616 B1 | 5/2001 | Sheridan |
| 6,318,070 B1 | 11/2001 | Rey et al. |
| 6,814,541 B2 | 11/2004 | Evans et al. |
| 6,860,716 B2 | 3/2005 | Czachor et al. |
| 7,021,042 B2 | 4/2006 | Law |
| 7,025,562 B2 * | 4/2006 | Imbourg ............... F01D 5/082 415/115 |
| 7,591,754 B2 | 9/2009 | Duong et al. |
| 7,694,505 B2 | 4/2010 | Schilling |
| 7,762,087 B2 | 7/2010 | Somanath et al. |
| 7,775,049 B2 | 8/2010 | Kumar et al. |
| 7,797,946 B2 | 9/2010 | Kumar et al. |
| 7,824,305 B2 | 11/2010 | Duong et al. |
| 7,926,260 B2 | 4/2011 | Sheridan et al. |
| 8,061,969 B2 | 11/2011 | Durocher et al. |
| 8,152,451 B2 * | 4/2012 | Manteiga ............... F01D 9/02 415/115 |
| 8,191,374 B2 * | 6/2012 | Nanataki ............... F01D 5/082 415/115 |
| 8,205,432 B2 | 6/2012 | Sheridan |
| 8,371,812 B2 | 2/2013 | Manteiga et al. |
| 9,279,341 B2 * | 3/2016 | Durocher ............. F01D 25/125 |
| 2004/0024098 A1 | 12/2004 | Czachor et al. |
| 2010/0021286 A1 | 1/2010 | Somanath et al. |
| 2010/0132370 A1 | 6/2010 | Durocher et al. |
| 2010/0132371 A1 | 6/2010 | Durocher et al. |
| 2010/0132374 A1 | 6/2010 | Manteiga et al. |
| 2010/0135777 A1 | 6/2010 | Manteiga et al. |
| 2010/0148396 A1 | 6/2010 | Xie et al. |
| 2010/0331139 A1 | 12/2010 | McCune |
| 2011/0030386 A1 | 2/2011 | Kumar et al. |
| 2011/0079019 A1 | 4/2011 | Durocher et al. |

FOREIGN PATENT DOCUMENTS

| | | |
|---|---|---|
| WO | 2007038674 | 4/2007 |
| WO | 2010002296 | 1/2010 |

OTHER PUBLICATIONS

European Search Report for Application No. 13775526.0 dated Nov. 4, 2015.
Janes's Aero-Engines, edited by Bill Gunston, Issue Seven, Mar. 2000.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-153.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers,108(8), 65-67.
Faghri, A. (1995). Heat pipe and science technology. Washington, D.C.: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report. NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.

(56) References Cited

OTHER PUBLICATIONS

Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.

\* cited by examiner

INTERNAL MANIFOLD FOR TURNING MID-TURBINE FRAME FLOW DISTRIBUTION

CROSS-REFERENCE TO RELATED APPLICATION

This application is a continuation of U.S. application Ser. No. 13/360,988 filed Jan. 30, 2012.

TECHNICAL FIELD

The present disclosure relates generally to gas turbine engines, and more particularly to an internal manifold for a mid-turbine frame (MTF) of a gas turbine engine.

BACKGROUND OF THE INVENTION

A mid-turbine frame (MTF), and particularly a turning mid-turbine frame (TMTF) is positioned between a high pressure turbine stage and a low pressure turbine stage of a gas turbine engine. The MTF supports multiple bearings and transfers bearing loads from an inner portion of the gas turbine engine to an outer engine frame.

The MTF also serves to route air from a high pressure compressor to one or both of a high pressure turbine stage and a low pressure turbine stage. Existing MTF designs route air through a purge air section of the MTF, causing the air to become heated via exposure to a gas path passing through the MTF.

When the air exiting the MTF and entering the turbine stages is an excessively high temperature, turbine components, such as rotor discs and rotor blades, can have a reduced lifespan. The reduced lifespan can result in increased maintenance frequency, increased maintenance costs, and increased manufacturing costs when higher lifespan components are used.

SUMMARY OF THE INVENTION

A turbine engine according to an exemplary aspect of the present disclosure includes, among other things, a compressor section, a combustor in fluid communication with the compressor section, a turbine in fluid communication with the combustor, wherein said turbine comprises a first turbine section and a second turbine section, a mid-turbine frame having an outer mid-turbine frame case connected to an inner mid-turbine frame case via a plurality of support members; and said inner mid-turbine frame case having and inner manifold for distributing gas to at least one of said first turbine section and said second turbine section.

In a further non-limiting embodiment of the foregoing turbine engine, the turbine engine may include an inner manifold that comprises an outlet operable to distribute gas to said first turbine section.

In a further non-limiting embodiment of either of the foregoing turbine engines, the turbine engine may include a first turbine section that is a low pressure turbine.

In a further non-limiting embodiment of any of the foregoing turbine engines, the turbine engine may include a first turbine section that is a high pressure turbine.

In a further non-limiting embodiment of any of the foregoing turbine engines, the turbine engine may include an inner manifold that comprises a second gas outlet operable to distribute gas to the second turbine section.

In a further non-limiting embodiment of any of the foregoing turbine engines, the turbine engine may include a plurality of support members that comprises a tie-rod having an internal gas passage for connecting a gas flow to the inner manifold.

In a further non-limiting embodiment of any of the foregoing turbine engines, the turbine engine may include a plurality of tie-rods connected to a mid-stage compressor bleed of a high pressure compressor on a first end, and connected to the inner manifold on a second end, such that air from the mid stage compressor bleed of the high pressure compressor is directed to the inner manifold.

In a further non-limiting embodiment of any of the foregoing turbine engines, the turbine engine may include an internal gas passages connected to the inner manifold via a flow distribution panel.

In a further non-limiting embodiment of any of the foregoing turbine engines, the turbine engine may include flow distribution panels comprising a plurality of holes operable to approximately evenly distribute air passing from the gas passage into the inner manifold.

In a further non-limiting embodiment of any of the foregoing turbine engines, the turbine engine may include a plurality of gas pipes fluidly connecting the compressor section to the inner manifold.

In a further non-limiting embodiment of any of the foregoing turbine engines, the turbine engine may include an inner manifold comprising a seal operable to prevent a majority of air from escaping the inner manifold other than through an outlet passage.

In a further non-limiting embodiment of any of the foregoing turbine engines, the turbine engine may include a plurality of support members comprising at least nine support members.

A method of segregating rotor air in a gas turbine engine according to another exemplary aspect of the present disclosure includes, among other things, piping air from a mid-stage compressor to an inner manifold of a mid-turbine frame (MTF), and directing air from the inner manifold to at least one turbine section of a gas turbine engine.

In a further non-limiting embodiment of any of the foregoing method of segregating rotor air in a gas turbine engine, the method may include the step of directing air from the inner manifold to at least one turbine section of a gas turbine engine comprises passing air through an inner manifold outlet to a low pressure turbine rotor.

In a further non-limiting embodiment of the foregoing method of segregating rotor air in a gas turbine engine, the method may include the step of directing air from the inner manifold to at least one turbine section of a gas turbine engine comprises passing air through an inner manifold outlet to a high pressure turbine rotor.

In a further non-limiting embodiment of the foregoing method of segregating rotor air in a gas turbine engine, the method may include the step of directing air from the inner manifold to at least one turbine section of a gas turbine engine comprises passing air through a first inner manifold outlet to a low pressure turbine rotor and through a second inner manifold outlet to a high pressure turbine rotor.

In a further non-limiting embodiment of the foregoing method of segregating rotor air in a gas turbine engine, the method may include the step of piping air from the mid-stage compressor to the MTF manifold comprises passing the mid-stage compressor air through a gas passage in an MTF tie rod, thereby segregating the rotor air from MTF purge air.

In a further non-limiting embodiment of the foregoing method of segregating rotor air in a gas turbine engine, the method may include the step of passing the air through a flow distribution panel, thereby mixing air entering the inner manifold, thereby minimizing localized hot/cold regions in the inner manifold.

A mid turbine frame according to another exemplary aspect of the present disclosure includes, among other things, an outer mid-turbine frame case connected to an inner mid-turbine frame case via a plurality of support members, and the inner mid-turbine frame case having an inner manifold for distributing gas to at least one of a first turbine section and a second turbine section of a gas turbine engine.

In a further non-limiting embodiment of the foregoing mid turbine frame, the mid turbine frame may include an inner manifold comprising an outlet operable to distribute gas to a first turbine section.

In a further non-limiting embodiment of the foregoing mid turbine frame, the mid turbine frame may include an inner manifold further comprising a second gas outlet operable to distribute gas to a second turbine section.

In a further non-limiting embodiment of the foregoing mid turbine frame, the mid turbine frame may include a plurality of support members comprising a tie-rod having an internal gas passage for connecting a gas flow to the inner manifold.

In a further non-limiting embodiment of the foregoing mid turbine frame, the mid turbine frame may include a plurality of tie-rods connected to a gas source on a first end, and connected to the inner manifold on a second end, such that air from the gas source is directed to the inner manifold.

In a further non-limiting embodiment of the foregoing mid turbine frame, the mid turbine frame may include internal gas passages connected to the inner manifold via a flow distribution panel.

In a further non-limiting embodiment of the foregoing mid turbine frame, the mid turbine frame may include flow distribution panels comprising a plurality of holes operable to approximately evenly distribute air passing from the gas passage into the inner manifold.

In a further non-limiting embodiment of the foregoing mid turbine frame, the mid turbine frame may include a plurality of gas pipes fluidly connecting a gas source to the inner manifold.

In a further non-limiting embodiment of the foregoing mid turbine frame, the mid turbine frame may include an inner manifold comprising a seal operable to prevent a majority of air from escaping the inner manifold other than through an outlet passage.

These and other features of the present invention can be best understood from the following specification and drawings, the following of which is a brief description.

DETAILED DESCRIPTION OF A PREFERRED EMBODIMENT

Figure 1:
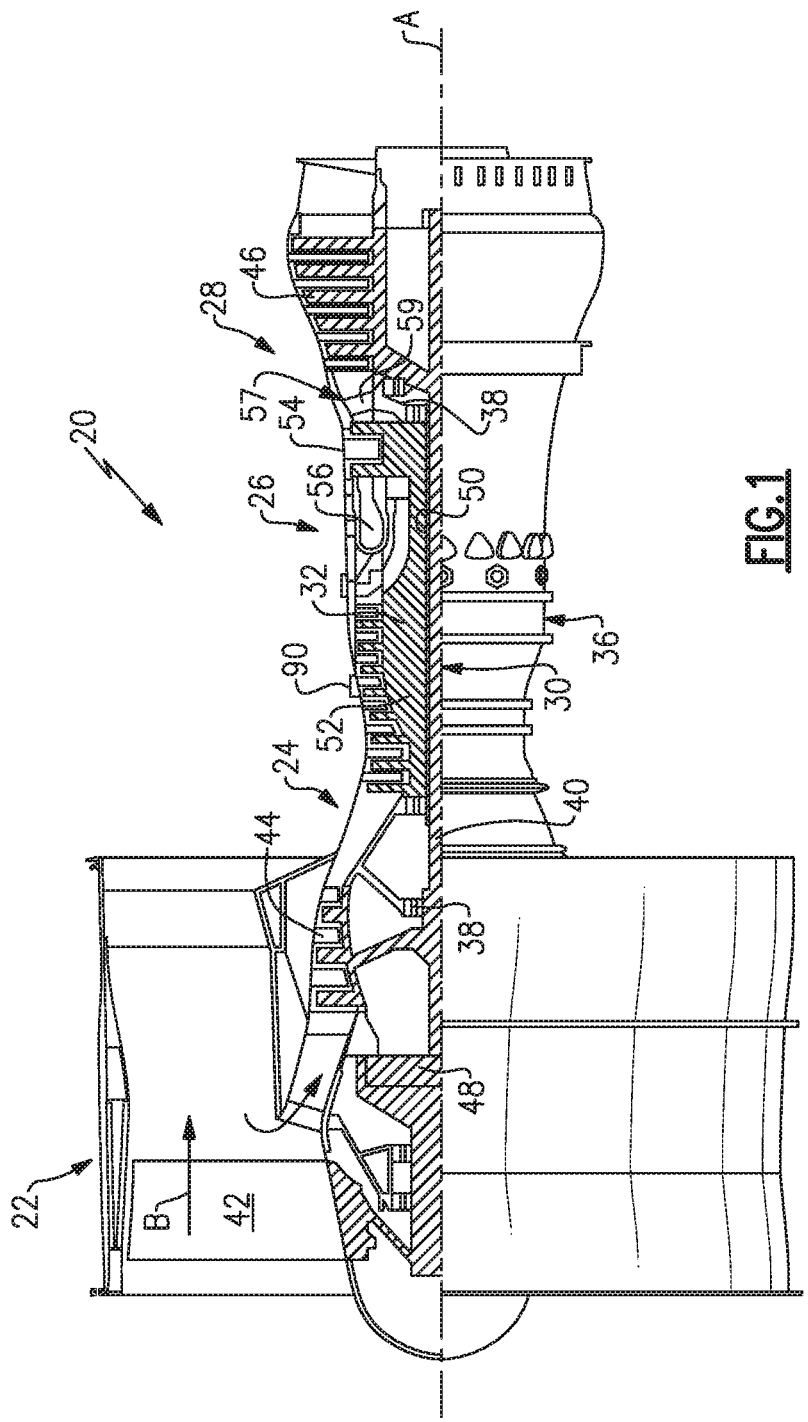
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine section 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine section 54. A combustor 56 is arranged between the high pressure compressor 52 and the high pressure turbine section 54. A mid-turbine frame 57 of the engine static structure 36 is arranged generally between the high pressure turbine section 54 and the low pressure turbine section 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine section 54 and low pressure turbine section 46. The mid-turbine frame 57 includes airfoils 59 which are in the core airflow path. The turbine sections 46, 54 rotationally drive the respective low speed spool 30 and high speed spool 32 in response to the expansion.

The engine 20 in one example a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine section 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine section 46 has a pressure ratio that is greater than about 5:1. Low pressure turbine section 46 pressure ratio is pressure measured prior to inlet of low pressure turbine section 46 as related to the pressure at the outlet of the low pressure turbine section 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans. A significant amount of thrust is provided by the bypass flow B due to the high bypass ratio.

The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Figure 2:
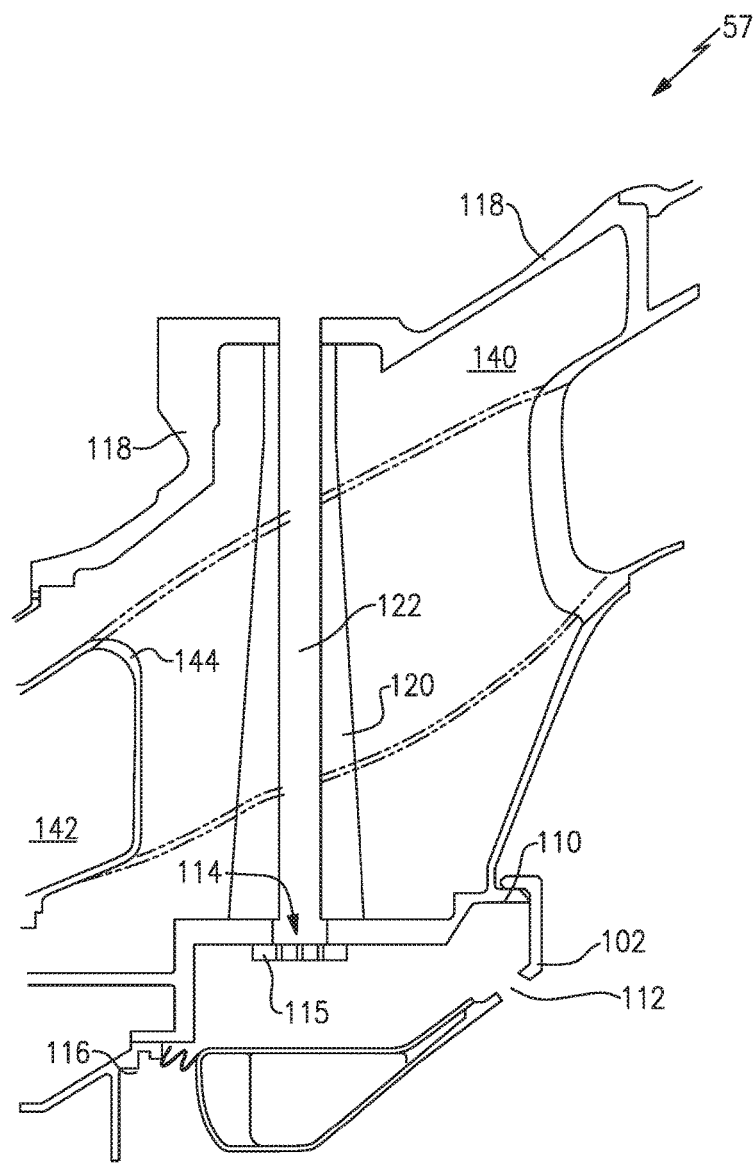
FIG. 2 schematically illustrates a mid-turbine frame (MTF) segment of the gas turbine engine of FIG. 1.

Referring now to FIG. 2, with continued reference to FIG. 1, a zoomed in cross sectional view of the mid-turbine frame (MTF) 57 is illustrated in FIG. 2. The MTF 57 includes an inner frame case 102 having an inner manifold 110. The inner frame case 102 is connected to an outer frame case 118 via multiple support members, such as tie rods 120, spokes or the like. In one example embodiment, the inner frame case 102 is connected to the outer frame case 118 via nine tie rods 120. In alternate non-limiting examples, the support members can be integral or non-integral and can have any desired profile such as curved, straight, or conical. The particular profile and the integral or non-integral nature of the support members depends engine design characteristics that are known to one of skill in the art.

A gaspath 142 carrying high temperature air passes through the MTF 57. Air within the purge air section 140 of the MTF 57 picks up heat from the walls 144 of the gaspath 142. Existing gas turbine engine designs incorporate an opening in the purge air section 140 of the MTF 57 and feed purge air to the low pressure turbine section 46 rotor as rotor air. As a result, air fed to the low pressure turbine section 46 rotor in these configurations is heated by the gaspath 142. The heating of the rotor air can decrease performance of the gas turbine engine 20.

In some embodiments of the present disclosure, the inner manifold 110 of the MTF 57 has a gas outlet 112 that allows air in the inner manifold 110 to flow to the low pressure turbine section 46, thereby providing air to a low pressure turbine rotor. The inner manifold 110 also includes an inner manifold seal 116 that prevents the gas from leaking out of the inner manifold 110 at locations other than the gas outlet 112.

The tie rods 120 are hollow and include a gas passage 122 that connects to the inner manifold 110, and the inner frame case 102, via an opening 114 in the inner manifold 110. The tie rods 120 are connected to the outer frame case 118, thereby allowing the MTF 57 to provide structural support for the gas turbine engine 20. The tie-rod 120 is connected to a mid-stage compressor bleed 90 of the high pressure compressor 52 (illustrated in FIG. 1), thereby directing air from the mid stage compressor bleed 90 of the high pressure compressor 52 to the inner manifold 110, through the gas passage 122 in the hollow tie rod 120.

In some embodiments, the opening 114 connecting the tie rod 120 to the inner manifold 110 is covered by a flow distribution panel 115. In the arrangement of FIG. 2, the flow distribution panel 115 is retained within the inner manifold 110, and is held in place via at least one fastener. In an alternate arrangement, the flow distribution panel 115 can be retained between the inner manifold 110 and the tie rod 120 and held in place via pressure from the connection between the inner manifold 110 and the tie rod 120. The flow distribution panel 115 includes holes that allow gas to flow through the opening 114, and into the inner manifold 110. The holes are smaller than the opening 114 and cause the gas entering the inner manifold 110 to mix, resulting in an even distribution of temperature throughout the air entering the inner manifold 110.

By including an inner manifold 110 and connecting the inner manifold 110 to air from the mid stage compressor bleed of the high pressure compressor 52 via the tie rod 120, air can be directly piped to the inner manifold 110 from the high pressure compressor 52 and segregated from the gas-path 142 and the air in the purge air section 140. Segregating the rotor air causes the rotor air to pick up minimal amounts of heat from the gaspath 142 and from the air in the purge air section 140 prior to entering the inner manifold 110. In turn, the cooler air in the inner manifold 110 is distributed to the low pressure turbine section 46 rotor, thereby improving performance of the gas turbine engine 20.

In some embodiments, a second inner manifold outlet can be located on a high pressure side of the inner manifold 110 and direct air from the inner manifold 110 to the high pressure turbine section 54. Alternatively, the gas outlet 112 can be located on the high pressure side and direct air from the inner manifold 110 to only the high pressure turbine section 54.

In an alternate embodiment to the embodiment illustrated in FIG. 2, one or more dedicated gas pipes can be used to connect the air from the mid stage compressor bleed of the high pressure compressor 52 to the inner manifold 110. In such an arrangement, the tie rods 120 can be solid rods, and the hex nut 130 can omit the bypass passage holes 132. Furthermore, in such an arrangement, the gas pipes are not required to provide structural support to the MTF 57.

Figure 3:
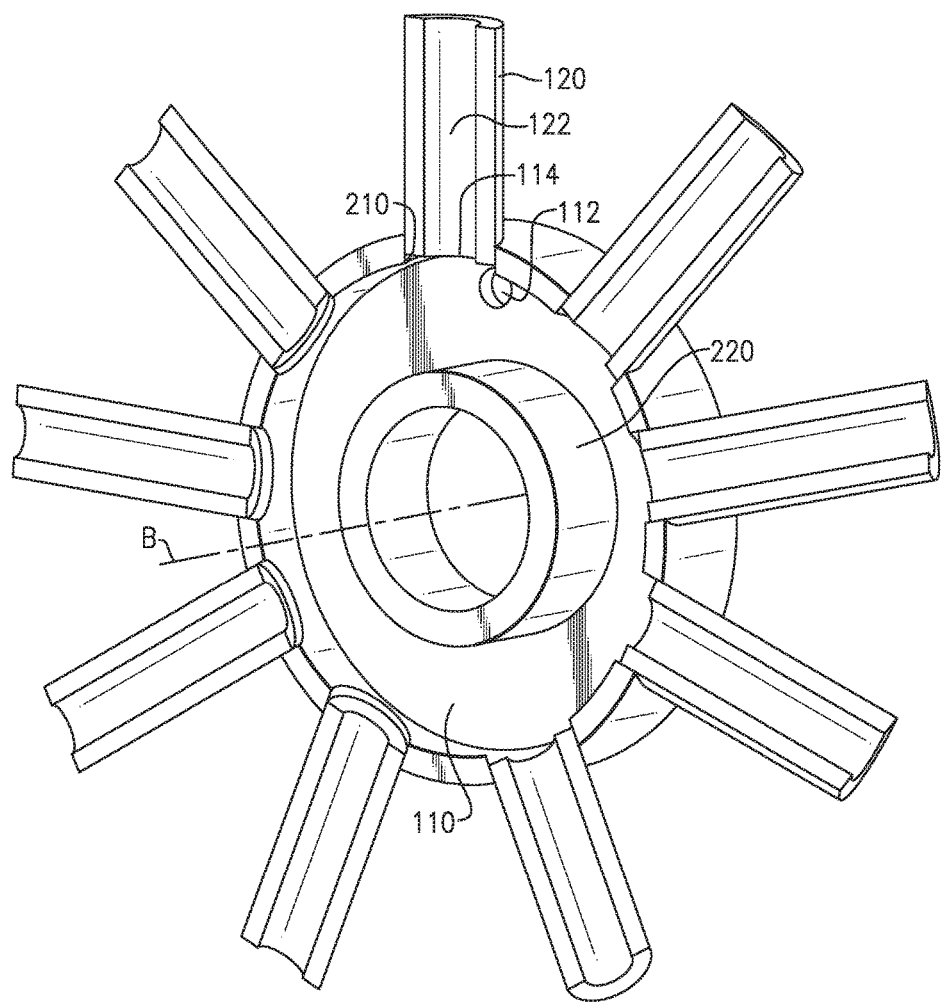
FIG. 3 is an isometric view of an inner manifold of the MTF of FIG. 2.

With continued reference to FIGS. 1 and 2, FIG. 3 illustrates an isometric view of an example inner manifold 110. The example view is bisected along a plane perpendicular to an axis B defined by the inner manifold 110. Each of the tie rods 120 connects into a receiving slot 210 in the inner manifold. A central component 220 connects the manifold 110 to an inner portion of the mid-turbine frame, via bearing systems 38. A single outlet 112 allows fluid entering the manifold 110 through the tie rods 120 to exit into the low pressure turbine section 46 as rotor air. Although the manifold 110 is illustrated in FIG. 3 as a cylinder, it is understood that alternate designs having an approximately circular cross section could additionally be used depending on the particular needs of the gas turbine engine 20.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. turbine engine comprising:
   a compressor section;
   a combustor in fluid communication with the compressor section;
   a turbine in fluid communication with the combustor, wherein said turbine comprises a first turbine section and a second turbine section;
   a mid-turbine frame including a plurality of support members, and an inner mid-turbine frame case disposed radially inward of a core flow path, the inner mid-turbine frame case having an inner manifold for distributing a gas to at least one of said first turbine section and said second turbine section, the inner manifold being at least partially defined by a radially inner wall aligned with an axis defined by a centerline of the turbine engine;

each of said plurality of support members comprises a tie-rod of a plurality of tie-rods having an internal gas passage of a plurality of internal gas passages for connecting a flow of the gas to said inner manifold, wherein a radially inward end of each tie-rod in the plurality of tie-rods is attached to said inner mid-turbine frame case; and wherein each of said plurality of internal gas passages is connected to said inner manifold via a flow distribution panel of a plurality of flow distribution panels, wherein each of the plurality of flow distribution panels is attached to the inner mid-turbine frame case and disposed between the inner manifold and the internal gas passage corresponding to the flow distribution panel, and wherein each of the plurality of flow distribution panels comprises a plurality of holes connecting the internal gas passage corresponding to the flow distribution panel to the inner manifold.

2. The turbine engine of claim 1, wherein said inner manifold comprises an outlet operable to distribute the gas to said first turbine section.

3. The turbine engine of claim 2, wherein said first turbine section is a low pressure turbine.

4. The turbine engine of claim 1, wherein the plurality of holes are operable to approximately evenly distribute the gas passing from said internal gas passage into said inner manifold.

5. The turbine engine of claim 1, further comprising a plurality of gas pipes fluidly connecting said compressor section to said inner manifold.

6. The turbine engine of claim 1, wherein said inner manifold comprises a seal operable to prevent a majority of the gas from escaping said inner manifold other than through an outlet passage.

7. The turbine engine of claim 1, further comprising a fan connected to said second turbine section via a shaft.

8. The turbine engine of claim 7, wherein a connection between the fan and the shaft is a geared connection.

9. The turbine engine of claim 7, wherein the fan is positioned forward of a core flowpath inlet and forward of a bypass flowpath inlet.

10. The turbine engine of claim 1, wherein the turbine engine is a geared turbofan (GTF) engine.

11. A method of segregating rotor air in a gas turbine engine comprising the steps of:

piping the rotor air from a mid-stage compressor to an inner manifold of a mid-turbine frame (MTF) by at least passing said rotor air from the mid-stage compressor through a gas passage in an MTF tie rod, wherein a radially inward end of the MTF tie rod is attached to an inner mid-turbine frame case, the inner mid-turbine frame case being disposed radially inward of a core flow path, the gas passage being connected to the inner manifold via a flow distribution panel, thereby segregating said rotor air from MTF purge air, the inner manifold being at least partially defined by a radially inner wall aligned with an axis defined by a centerline of the gas turbine engine, wherein the flow distribution panel is attached to the inner mid-turbine frame case and disposed between the inner manifold and the gas passage, and wherein the flow distribution panel comprises a plurality of holes connecting the gas passage to the inner manifold.

12. The method of claim 11, further comprising directing the rotor air from said inner manifold to at least one turbine section of the gas turbine engine.

13. The method of claim 12, wherein said step of directing the rotor air from said inner manifold to the at least one turbine section of the gas turbine engine comprises passing the rotor air through an inner manifold outlet to a low pressure turbine rotor.

14. The method of claim 11, further comprising a step of passing said rotor air through the flow distribution panel, thereby mixing the rotor air entering said inner manifold, thereby minimizing localized hot/cold regions in said inner manifold.

15. A mid turbine frame comprising;

a plurality of support members connected to an inner mid turbine frame case, the inner mid turbine frame case being disposed radially inward of a core flow path; each of the plurality of support members including an internal gas passage in a plurality of internal gas passages, wherein a radially inward end of each support member of said plurality of support members is attached to said inner mid-turbine frame case;

said inner mid-turbine frame case having an inner manifold for distributing a gas to at least one of a first turbine section and a second turbine section of a gas turbine engine, the inner manifold being at least partially defined by a radially inward wall, the radially inward wall being aligned with an axis defined by a centerline of the gas turbine engine; and each of the plurality of internal gas passages being connected to the inner manifold via a corresponding flow distribution panel in a plurality of flow distribution panels, wherein each of the plurality of flow distribution panels is attached to the inner mid-turbine frame case and disposed between the inner manifold and the internal gas passage corresponding to the flow distribution panel, and wherein each of the plurality of flow distribution panels comprises a plurality of holes connecting the internal gas passage corresponding to the flow distribution panel to the inner manifold.

16. The mid turbine frame of claim 15, wherein said inner manifold comprises an outlet operable to distribute the gas to the first turbine section.

17. The mid turbine frame of claim 15, wherein each of said plurality of support members comprises a tie-rod in a plurality of tie rods, having the internal gas passage for connecting a flow of the gas to said inner manifold.

18. The mid turbine frame of claim 17, wherein each of said plurality of tie-rods is connected to a gas source on a first end, and is connected to said inner manifold on a second end, such that the gas from said gas source is directed to said inner manifold.

19. The mid turbine frame of claim 17, wherein the plurality of holes are operable to approximately evenly distribute the gas passing from said internal gas passage into said inner manifold.

20. The mid turbine frame of claim 15, further comprising a plurality of gas pipes fluidly connecting a gas source to said inner manifold.

21. The mid turbine frame of claim 15, wherein said inner manifold comprises a seal operable to prevent a majority of the gas from escaping said inner manifold other than through an outlet passage.

* * * * *